United States Patent
Hong et al.

(10) Patent No.: US 7,765,027 B2
(45) Date of Patent: Jul. 27, 2010

(54) APPARATUS AND METHOD FOR ESTIMATING A POSITION AND AN ORIENTATION OF A MOBILE ROBOT

(75) Inventors: Sun-gi Hong, Gyeonggi-do (KR); Seokwon Bang, Seoul (KR); Dong Ryeol Park, Gyeonggi-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1297 days.

(21) Appl. No.: 10/941,846

(22) Filed: Sep. 16, 2004

(65) Prior Publication Data

US 2005/0065655 A1 Mar. 24, 2005

(30) Foreign Application Priority Data

Sep. 16, 2003 (KR) .................... 10-2003-0064242

(51) Int. Cl.
*G06F 19/00* (2006.01)
(52) U.S. Cl. .................. 700/245; 700/259; 901/20; 901/44; 901/45; 701/23; 701/300; 180/167; 180/168; 180/169; 340/901; 340/933; 340/937; 340/938; 340/988; 356/399; 356/400
(58) Field of Classification Search ................ 700/245, 700/59, 259; 701/23, 300; 901/45, 20, 44; 340/988, 901, 933, 937, 938; 180/167, 168, 180/169; 356/399, 400
See application file for complete search history.

(56) References Cited

U.S. PATENT DOCUMENTS 4,281,342 A * 7/1981 Ueda et al. .................. 348/94
4,647,784 A * 3/1987 Stephens .................. 250/559.3
4,790,402 A * 12/1988 Field et al. .................. 180/169

(Continued)

FOREIGN PATENT DOCUMENTS

CN 1354073 6/2002

(Continued)

OTHER PUBLICATIONS

Shishir Shah and J. K. Aggarwal "A Simple Calibration Procedure for Fish-Eye (High Distortion) Lens Camera", Computer and Vision Research Center, Dept. of Electrical and Computer Engr., ENS 520, The University f Texas at Austin, Austin, Texas 78712-1084, USA (pp. 3422-3427).*

(Continued)

*Primary Examiner*—Khoi Tran
*Assistant Examiner*—Jorge O Peche
(74) *Attorney, Agent, or Firm*—Staas & Halsey LLP (57) ABSTRACT

A method and apparatus for estimating a position and an orientation of a mobile robot. The apparatus includes: a ceiling image grabber for obtaining a ceiling image of an area where the mobile device travels; a mark detector for detecting a retro-reflective artificial mark from the ceiling image, the retro-reflective artificial mark including a first mark and a second mark, each including a non-reflective portion and an infrared reflective portion; and a position & orientation estimator for estimating a position and an orientation of the mobile device using a position of the artificial mark or encoder information according to whether detection of the artificial mark is successful.

24 Claims, 11 Drawing Sheets

U.S. PATENT DOCUMENTS

| | | | | |
|---|---|---|---|---|
| 4,817,000 | A * | 3/1989 | Eberhardt | 701/200 |
| 4,846,297 | A * | 7/1989 | Field et al. | 180/169 |
| 4,947,094 | A * | 8/1990 | Dyer et al. | 318/587 |
| 4,996,468 | A * | 2/1991 | Field et al. | 318/587 |
| 5,040,116 | A * | 8/1991 | Evans et al. | 701/28 |
| 5,051,906 | A * | 9/1991 | Evans et al. | 701/28 |
| 5,187,662 | A * | 2/1993 | Kamimura et al. | 701/23 |
| 5,208,750 | A * | 5/1993 | Kurami et al. | 701/28 |
| 5,357,432 | A * | 10/1994 | Margolis et al. | 701/23 |
| 5,390,118 | A * | 2/1995 | Margolis et al. | 701/23 |
| 5,525,883 | A * | 6/1996 | Avitzour | 318/587 |
| 5,530,330 | A * | 6/1996 | Baiden et al. | 318/580 |
| 5,675,489 | A * | 10/1997 | Pomerleau | 701/28 |
| 5,754,280 | A * | 5/1998 | Kato et al. | 356/3.06 |
| 5,875,408 | A * | 2/1999 | Bendett et al. | 701/23 |
| 6,163,745 | A * | 12/2000 | Purchase et al. | 701/23 |
| 6,194,486 | B1 * | 2/2001 | Yujiri et al. | 523/172 |
| 6,356,343 | B1 * | 3/2002 | Shiraishi et al. | 355/77 |
| 6,414,606 | B1 * | 7/2002 | Yujiri et al. | 340/901 |
| 6,496,754 | B2 * | 12/2002 | Song et al. | 700/245 |
| 6,629,028 | B2 * | 9/2003 | Paromtchik et al. | 701/23 |
| 6,732,826 | B2 * | 5/2004 | Song et al. | 180/169 |
| 6,807,478 | B2 * | 10/2004 | Giannopoulos et al. | 701/207 |
| 7,231,063 | B2 * | 6/2007 | Naimark et al. | 382/103 |
| 7,480,958 | B2 * | 1/2009 | Song et al. | 15/319 |
| 2002/0091466 | A1 * | 7/2002 | Song et al. | 700/245 |
| 2003/0031368 | A1 * | 2/2003 | Myler et al. | 382/228 |
| 2004/0016077 | A1 * | 1/2004 | Song et al. | 15/319 |
| 2004/0073359 | A1 * | 4/2004 | Ichijo et al. | 701/201 |
| 2006/0025897 | A1 * | 2/2006 | Shostak et al. | 701/1 |

FOREIGN PATENT DOCUMENTS

| | | |
|---|---|---|
| CN | 1106913 | 4/2003 |
| DE | 40 23 952 A 1 | 2/1992 |
| EP | 0 363 339 | 4/1990 |
| JP | 01-274214 | 11/1989 |
| JP | 02-084331 | 3/1990 |
| JP | 04-041613 | 2/1992 |
| JP | 6-4127 | 1/1994 |
| JP | 2000-111344 | 4/2000 |

OTHER PUBLICATIONS

Ming-Kuei Hu (Senior Member, IRE), "Visual Pattern Recognition by AK Moment Invariants", IRE Transactions on Information Theory (pp. 179-187).*

Communication—European Search Report issued for Application No. 04255550.8—2206 dated Sep. 5, 2006.

Shishir Shah and J.K. Aggarwal, "A Simple Calibration Procedure for Fish-Eye (High Distortion) Lens Camera", Computer and Vision Research Center, Dept. of Electrical and Computer Engr., ENS 520, The University of Texas at Austin, Austin, Texas 78712-1084, USA (pp. 3422-3427).

Ming-Kuei Hu (Senior Member, IRE), "Visual Pattern Recognition by Moment Invariants", IRE Transactions on Information Theory (pp. 179-187).

Rafael C. Gonzalez, et al., "Digital Image Processing", Decision-Theoretic Methods, 1992, pp. 583-586.

Notice to Submit Response issued by the Korean Intellectual Property Office in Application No. 10-2003-0064242 on Jun. 24, 2005.

Chinese Office Action for corresponding Chinese Application 200410078958.9; issued Nov. 21, 2008.

Japanese Office Action for corresponding Japanese Application 2004-270092; dated Aug. 11, 2009.

Japanese Office Action for corresponding Japanese Application 2004-270092; dated Mar. 31, 2009.

Chinese Office Action for corresponding Chinese Application 200410078958.9; dated Jul. 10, 2009.

* cited by examiner

APPARATUS AND METHOD FOR ESTIMATING A POSITION AND AN ORIENTATION OF A MOBILE ROBOT

CROSS-REFERENCE TO RELATED APPLICATION

This application claims the benefit of Korean Patent Application No. 2003-64242, filed on Sep. 16, 2003, in the Korean Intellectual Property Office, the disclosure of which is incorporated herein by reference.

BACKGROUND OF THE INVENTION

1. Field of the Invention

The present invention relates to a mobile robot, and more particularly, to an apparatus and method of estimating the position and orientation of a mobile robot in dark environment or an environment having conditions resulting in changes of illumination.

2. Description of the Related Art

There are generally four methods of estimating the position and orientation of a mobile robot by using artificial beacons, or guides. A first method uses reflecting objects and a vision system. An example of this method is disclosed in U.S. Pat. No. 5,051,906, wherein an automatic guided vehicle (AGV) travels along a hallway using retro-reflective stripes attached to the ceiling. The orientation and position of the AGV is determined when the AGV travels along a long axis of the hallway. A second method uses only reflectors. Examples of this method are disclosed in U.S. Pat. No. 5,812,267 and U.S. Pat. No. 5,467,273. A third method uses a vision system and specific marks instead of reflectors. Examples of this method are disclosed in U.S. Pat. No. 5,525,883, U.S. Pat. No. 5,911,767, and U.S. Pat. No. 6,496,754. In U.S. Pat. No. 5,911,767, a mobile robot is localized by setting circles as coded signs and recognizing the coded signs. In particular, the robot's position and orientation are obtained using a ratio of two diameters of two concentric circles related to the coded signs discriminated from the environment. In U.S. Pat. No. 6,496,754, a location of a robot is detected using a base mark including two marks, and a shape of an obstacle is recognized using a laser beam. A fourth method uses a vision system and a light source instead of reflectors. An example of this method is disclosed in U.S. Pat. No. 4,797,557.

However, in the conventional methods described above, it is impossible to estimate the global position and orientation of a mobile robot in an entire environment wherein the mobile robot is capable of moving, and the accuracy of estimating the position and orientation varies according to environmental conditions, such as changes in illumination. Accordingly, it is difficult to use the conventional methods in a general indoor environment, such as a house.

SUMMARY OF THE INVENTION

The present invention provides an apparatus and method of estimating a position and an orientation of a mobile robot in a dark environment or in an environment having conditions that result in a severe change of illumination conditions. The present invention also provides a mobile robot employing the above method and apparatus.

According to an aspect of the invention, there is provided a method of estimating a position and an orientation of a mobile robot, the method includes obtaining a ceiling image of a place in which the mobile robot travels; detecting a retro-reflective artificial mark from the ceiling image, the retro-reflective artificial mark includes a first mark and a second mark, each including a non-reflective portion and an infrared reflective portion; and estimating a position and an orientation of the robot using a position of the artificial mark or encoder information according to whether detection of the artificial mark has succeeded. The artificial mark includes a first mark and a second mark, wherein the first mark and the second mark each have a non-reflective portion and an infrared reflective portion.

According to another aspect of the invention, there is provided an apparatus for estimating a position and an orientation of a mobile robot, the apparatus includes a ceiling image grabber obtaining a ceiling image of a place in which the mobile robot travels; a mark detector detecting a retro-reflective artificial mark from the ceiling image; and a position & orientation estimator estimating a position and an orientation of the robot using a position of the artificial mark or encoder information according to whether detection of the artificial mark has succeeded. The artificial mark includes a first mark and a second mark, wherein the first mark and the second mark each have a non-reflective portion and an infrared reflective portion.

According to another aspect of the invention, there is provided a mobile robot that includes a ceiling image grabber obtaining a ceiling image of a place in which the mobile robot travels; an image intensity comparator determining whether a light of a current environment is dark or bright by calculating an average intensity of the ceiling image and comparing the calculated average intensity with a predetermined reference value; a light controller controlling a light device attached to the mobile robot according to a determination result of the image intensity comparator; a mark detector detecting a retro-reflective artificial mark including a first mark and a second mark respectively having a non-reflective portion and an infrared reflective portion from the ceiling image; a position & orientation estimator estimating a position and an orientation of the robot using a position of the artificial mark or encoder information according to whether detection of the artificial mark has succeeded; and a motion controller controlling a motion of the mobile robot according to the position and orientation estimated by the position & orientation estimator.

According to another aspect of the invention, there is provided a computer readable medium having recorded thereon a computer readable program to be read by at least one computer for performing the method of estimating a position and an orientation of a mobile robot.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1A:
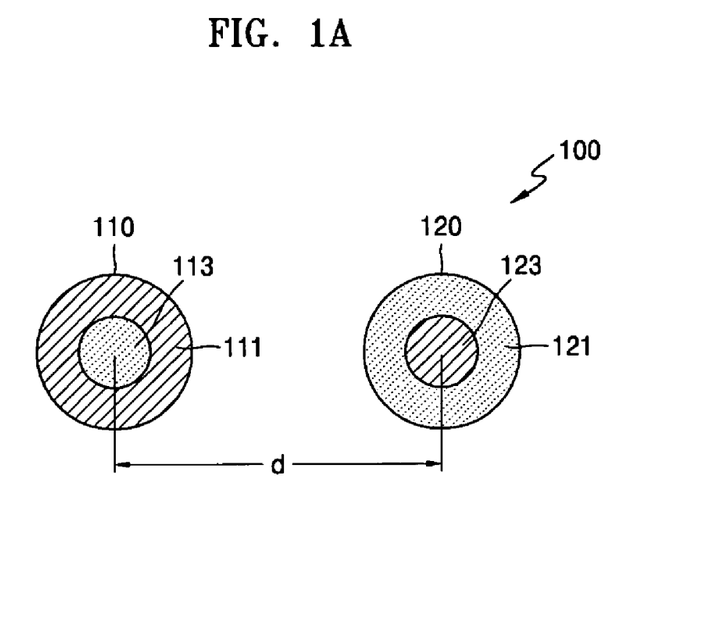
FIGS. 1A, 1B and 1C are illustrations of an artificial mark used in an embodiment of the invention.

Reference will now be made in detail to the embodiments of the present invention, examples of which are illustrated in the accompanying drawings, wherein like reference numerals refer to the like elements throughout. The embodiments are described below to explain the present invention by referring to the figures FIG. 1A is an illustration of an artificial mark 100 used in an aspect of the invention. The artificial mark 100 includes a first retro-reflective mark 110 and a second retro-reflective mark 120. An outer portion 111 of the first mark 110 and an inner portion 123 of the second mark 120 are non-reflective portions covered with an arbitrary color, for example, a black color, and an inner portion 113 of the first mark 110 and an outer portion 121 of the second mark 120 are infrared reflective portions.

In an aspect of the invention, the artificial mark is located near a center position of a ceiling area in a location where a mobile robot or mobile device travels to performs predetermined work, but the location of the artificial mark is not limited thereto. Also, the first and second marks 110 and 120 have an 11 cm outside diameter and a 7 cm inside diameter, and a distance between the first mark 110 and the second mark 120 is preferably 70 cm, but not limited thereto. The first and second marks 110 and 120 include circles that are positioned apart from each other at a predetermined distance. It is understood that the inner and outside diameters of the first mark 110 and the second mark 120, and the distance between the first mark and the second mark, are not limited to the above dimensions or any particular dimension.

Figure 1B:
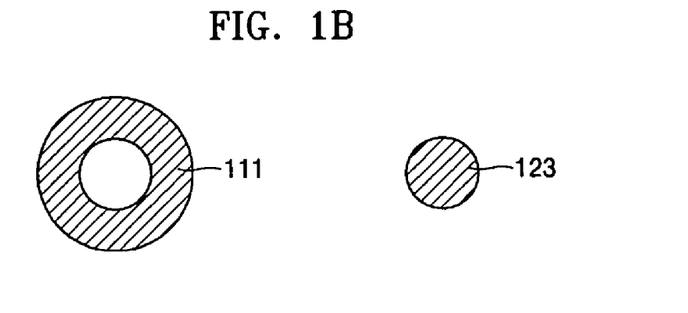
Figure 1C:
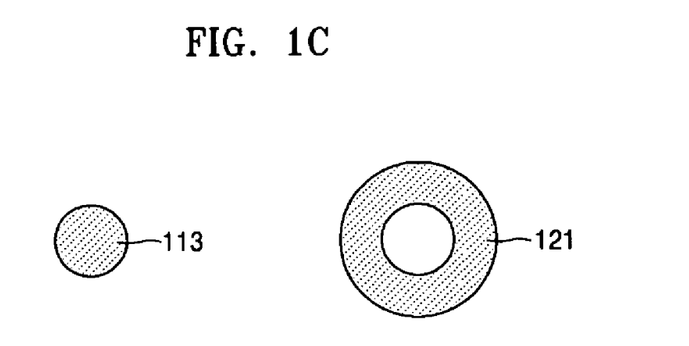

For example, in an aspect of the invention, when the artificial mark 110 having the pattern as shown in FIG. 1A is used during the daytime, the artificial mark 110 includes the outer portion 111 of the first mark 110 and the inner portion 123 of the second mark 120 as shown in FIG. 1B. However, when the artificial mark 110 having the pattern as shown in FIG. 1A is used during the nighttime, the artificial mark 110 includes the inner portion 113 of the first mark 110 and the outer portion 121 of the second mark 120 as shown in FIG. 1C.

Figure 2:
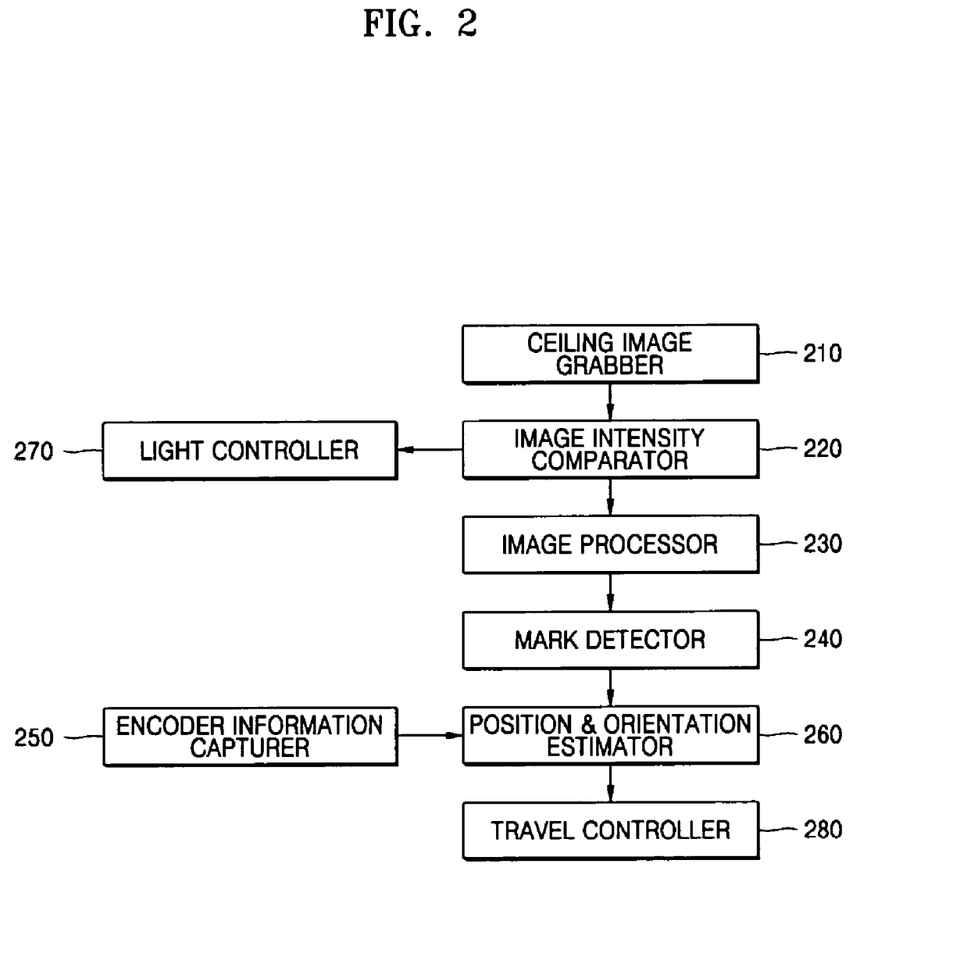
FIG. 2 is a block diagram of an apparatus for estimating a position and an orientation of a mobile robot according to an embodiment of the invention.

FIG. 2 is a block diagram of an apparatus for estimating a position and an orientation, i.e., a location, of a mobile robot according to an aspect of the invention. Referring to FIG. 2, the apparatus includes a ceiling image grabber 210, an image intensity comparator 220, an image processor 230, a mark detector 240, an encoder information capturer 250, a position & orientation estimator 260, a light controller 270, and a travel controller 280.

The ceiling image grabber 210 may be implemented by a wide-angle lens or a super-wide-angle lens, such as a fisheye lens, in order to obtain a ceiling image of a place in which the mobile robot travels to perform predetermined work.

The image intensity comparator 220 calculates an average intensity of the ceiling image by dividing a value of summing intensity of every pixels of the ceiling image by the number of all pixels, compares the calculated average intensity to a predetermined reference value, and determines whether a light of a current environment is dark or bright. Here, the reference value is, for example, set to 50 in the case of a 256-gray-scale, and it is determined that the light is bright when the average intensity is greater than 50 and the light is dark when the average intensity is not greater than 50. It is understood that the predetermined reference value may be set to any level in order to determine a state of lightness according to the average pixel intensity of the ceiling image.

Figure 6A:
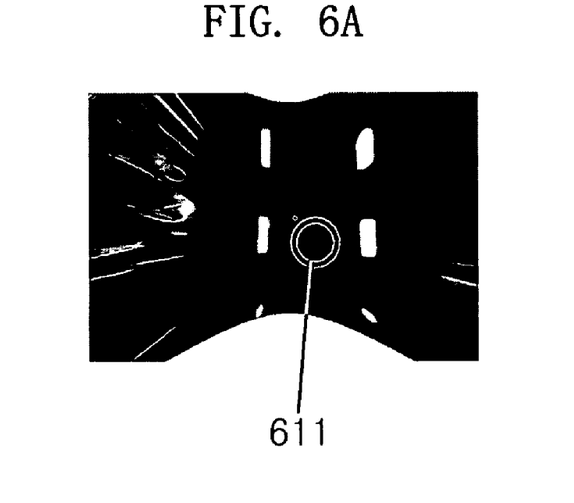
FIGS. 6A and 6B are a ceiling image photographed in the daytime and a reverse ceiling image photographed in the nighttime, respectively, according to an embodiment of the inventions.
Figure 6B:
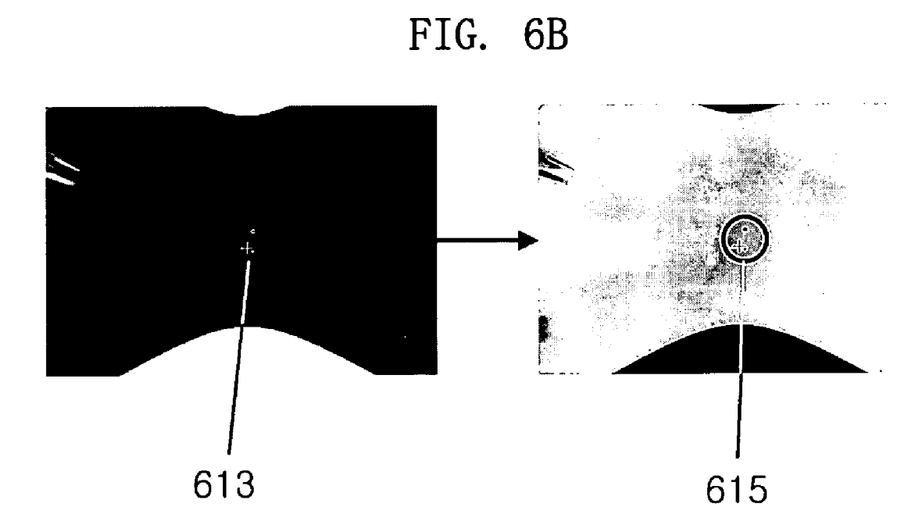

The image processor 230 does not perform when determined that the light is bright (greater than the reference value) and reverses the ceiling image when determined that the light is dark (not greater than the reference value.) FIG. 6A shows a ceiling image including an artificial mark 611 photographed in the daytime, and FIG. 6B shows a reverse ceiling image of a ceiling image including an artificial mark 613 or 615 photographed in the nighttime.

The image processor 230 performs at least one of distortion compensation processing and pre-processing procedures on a non-processed or reversed image. Technology with respect to the distortion compensation processing is described in "A simple calibration procedure for fish-eye (high distortion) lens camera" (Shas, S., Aggarwal, J. K., Robotics and Automation, IEEE International Conference on 8-13 May 1994, pages 3422-3427 vol. 4). This technology will now be described in detail with reference to FIGS. 7A through 9C.

Figure 7A:
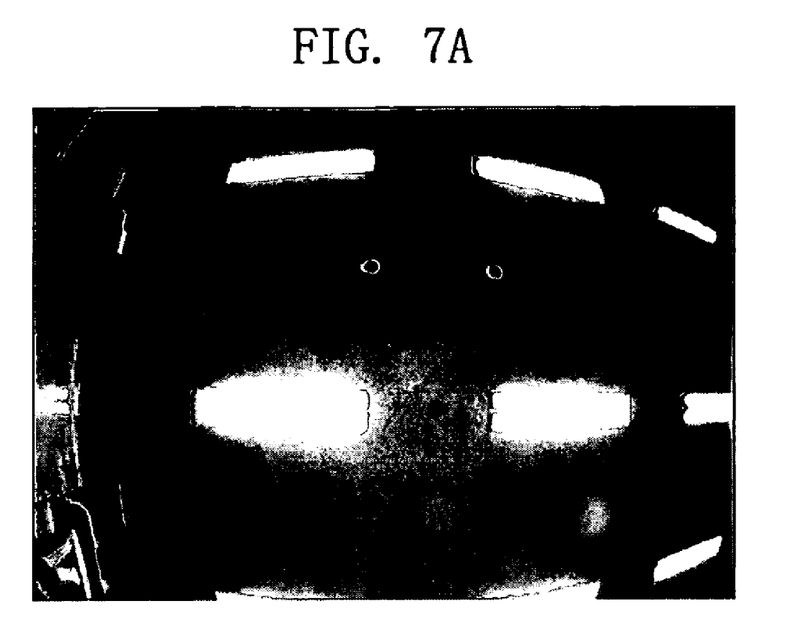
FIGS. 7A and 7B are ceiling images before and after compensating for an image distortion is performed, respectively, according to an embodiment of the invention.
Figure 7B:
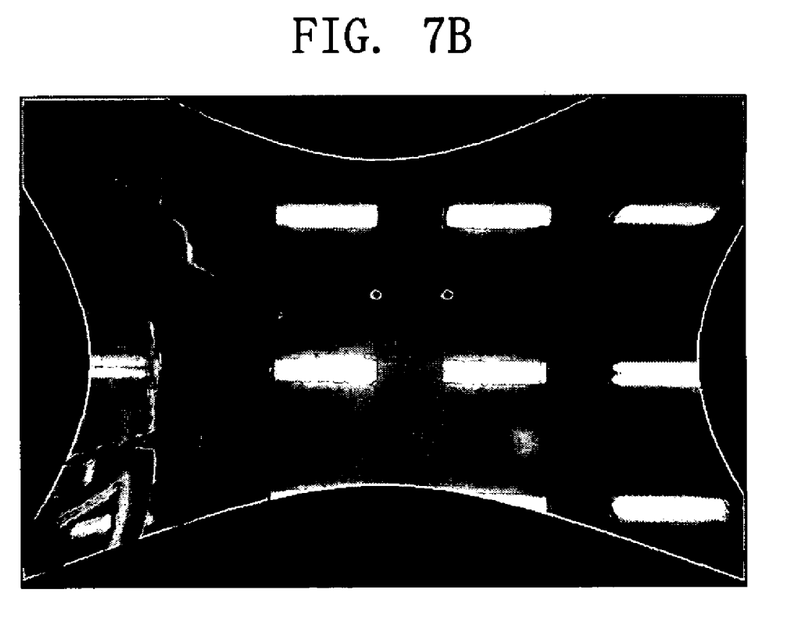

FIG. 7A is a ceiling image before a distortion compensation processing procedure is performed, and FIG. 7B is the ceiling image after a distortion compensation processing procedure is performed. When an angle of a camera lens used for the ceiling image grabber 210 is widened, the ceiling image becomes more distorted. Accordingly, since the ceiling image is different than an actual image, a distortion compensation processing procedure should be performed.

Figure 8A:
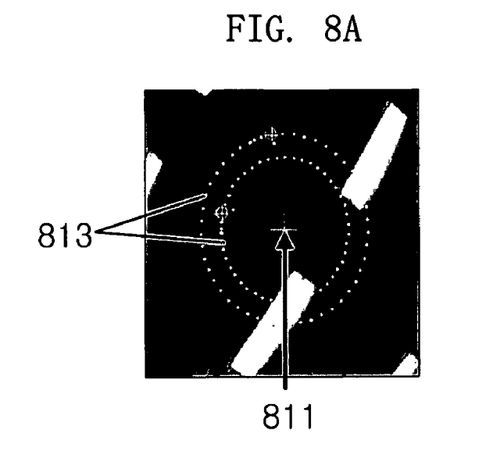
FIGS. 8A through 8C are ceiling images before and after a modeling procedure using an optical center is performed in a distortion compensation processing method, according to an embodiment of the invention.
Figure 8B:
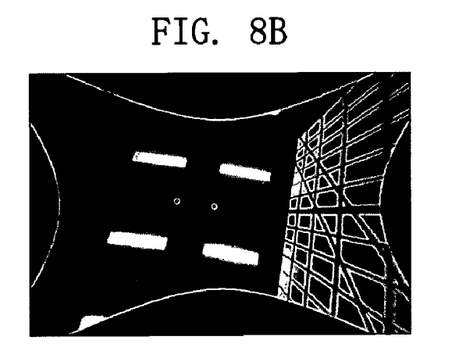
Figure 8C:
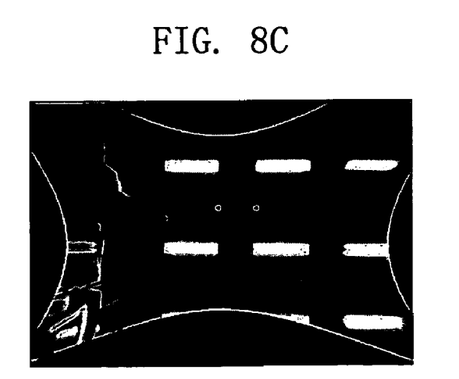

In detail, a method of performing a modeling procedure by extracting an optical center 811 and using two ellipses 813 that include the first and second marks 110 and 120 based on the optical center 811, as shown in FIG. 8A, may be used. According to this method, when an error is generated from extracting the optical center 811, a slanted image is obtained, as shown in FIG. 8B, and when the optical center 811 is exactly extracted, a well-compensated image is obtained, as shown in FIG. 8C. Here, the optical center 811 is used to obtain a normal view of the ceiling and indicates a point through which all light input to a camera passes and is projected on an image pickup device of the camera. The position of the optical center 811 does not change, even when the camera is rotated.

Figure 9A:
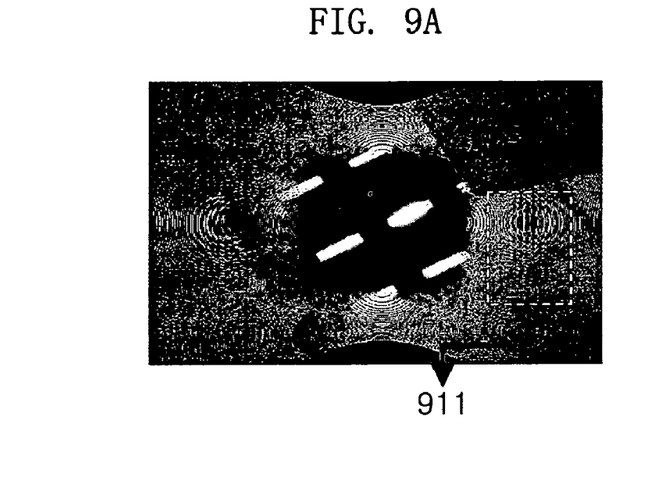
FIGS. 9A through 9C are ceiling images before and after an interpolating procedure is performed in a distortion compensation processing method, according to an embodiment of the invention.
Figure 9B:
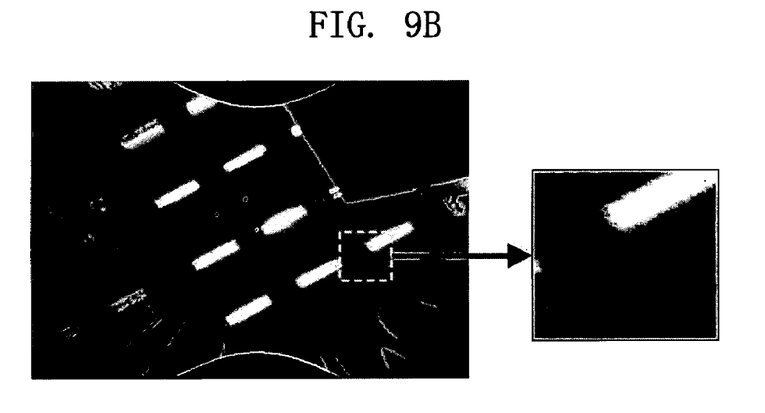
Figure 9C:
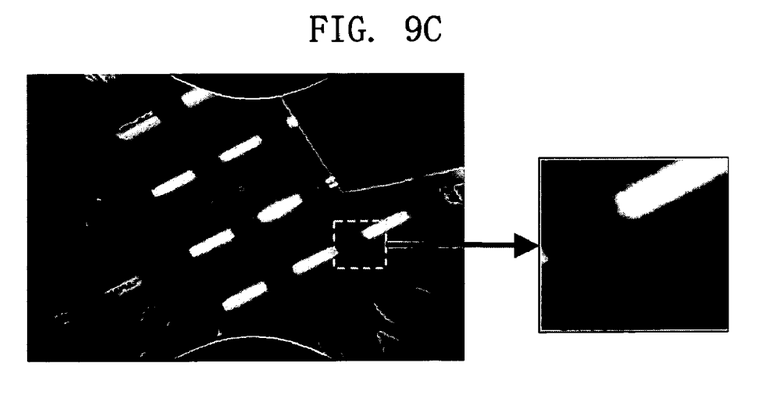

When the modeling procedure is performed, a region 911 in which pixels disappear is generated, as shown in FIG. 9A. The pixels that disappeared can be restored by an interpolation method. Here, a value of a pixel located in a nearest position to a pixel that disappeared according to a nearest neighbor method (N.N. method) is used as it is as shown in FIG. 9B, or a value obtained by averaging values of pixels near to a pixel to be interpolated is used as shown in FIG. 9C.

Figure 10:
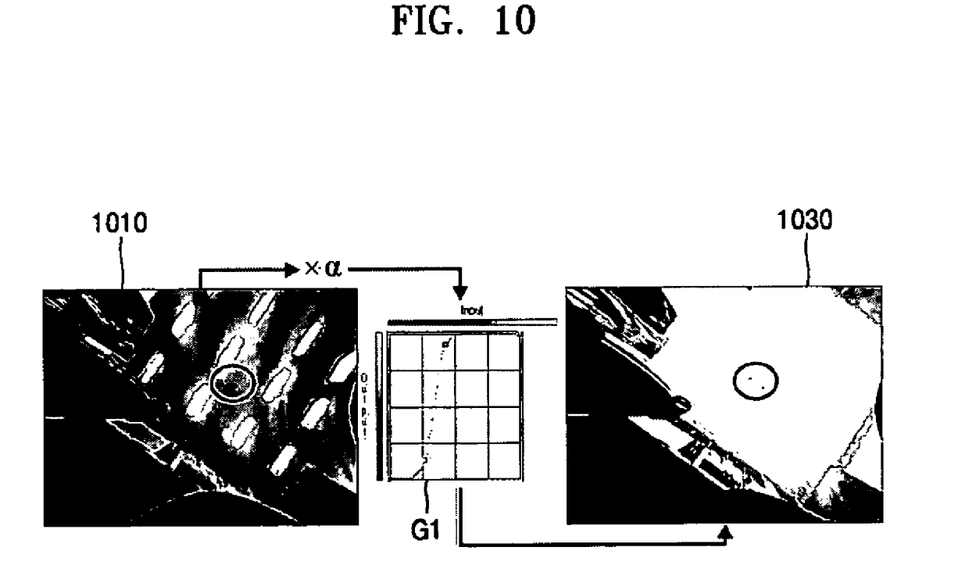
FIG. 10 shows ceiling images before and after a pre-processing procedure is performed, according to an embodiment of the invention.

The image processor 230 performs a pre-processing procedure of the ceiling image for which the distortion compensation processing procedure is performed. In FIG. 10, a reference number 1010 shows the ceiling image before the pre-processing procedure is performed, and a reference number 1030 shows the ceiling image after the pre-processing procedure is performed. In a pre-processing method, contrast and/or exposure are adjusted using a predetermined constant a and a contrast characteristic graph G1.

For example, when the exposure is adjusted by multiplying each pixel of the ceiling image by the constant α, and when the contrast is adjusted so that a dark portion becomes as it is or darker and a bright portion becomes brighter by applying the contrast characteristic graph G1 to the exposure-adjusted ceiling image, resolution of a specific pixel region, i.e., a pixel region including the first and second marks 110 and 120 of the artificial mark 100, increases. However, resolution of the other pixel regions is relatively lower than the increased resolution of the specific pixel region. A following image processing, such as a mark detection, can be performed by making the lightness of the artificial mark 100 largely different from a surrounding environment as a pre-processing result.

The mark detector 240 detects a mark candidate point from the ceiling image distortion-compensation-processed and pre-processed by the image processor 230 and detects a position of the artificial mark 100 by filtering the mark candidate points.

The encoder information capturer 250 obtains information of a position and an orientation of the mobile robot from at least one encoder sensor (not shown) attached to the mobile robot, preferably to at least one wheel of the mobile robot.

The position & orientation estimator 260 estimates the position and the orientation of the mobile robot using the position of the artificial mark 100 detected by the mark detector 240 or the information provided by the encoder information capturer 250. That is, when the mark detector 240 positionally detects the artificial mark 100, the position of the artificial mark 100 is used to estimate the position and the orientation of the mobile robot, and when the mark detector 240 fails to positionally detect the artificial mark 100, the position and orientation of the mobile robot is estimated using the encoder information.

When determined that outside light is in a dark state (as a result of determination of the image intensity comparator 220), the light controller 270 turns on a light device (not shown) increases an amount of light output from the light device. When determined that outside light is in a bright state (as a result of determination of the image intensity comparator 220), the light controller 270 turns off the light device or reduces the amount of light output from the light device. The light device may be attached to the mobile robot or device.

The motion controller 280 controls the mobile robot to travel along a pre-set or predetermined path using the position and orientation information of the mobile robot obtained by the position & orientation estimator 260.

Figure 3:
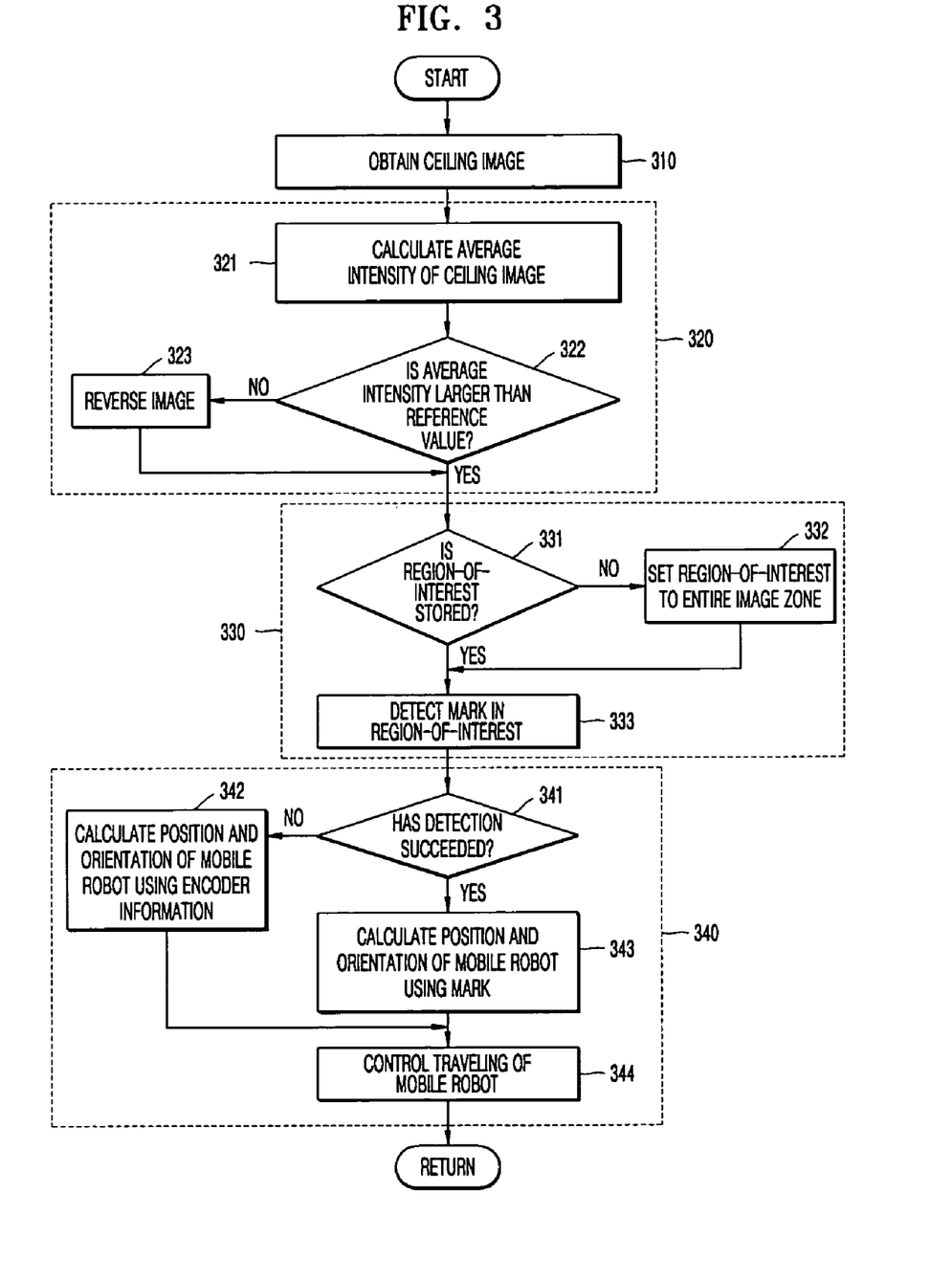
FIG. 3 is a flowchart illustrating a method of estimating a position and an orientation of a mobile robot according to an embodiment of the invention.

FIG. 3 is a flowchart illustrating a method of estimating a position and an orientation of a mobile robot according to an aspect of the invention. Referring to FIG. 3, a ceiling image of an area in which a mobile robot travels is obtained using a wide-angle or super wide-angle camera in operation 310.

A light state of a current environment is determined in operation 320. In operation 321, the light state is determined by calculating an average intensity of the ceiling image obtained in operation 310. In operation 322, whether the light is in a dark state or a bright state is determined by comparing the calculated average intensity to a predetermined reference value. That is, it is determined that the light is in the bright state when the average intensity is greater than the predetermined reference value, and the light is in the dark state if the average intensity is not greater than the predetermined reference value. In operation 323, when determined that the light is in the dark state, the ceiling image is reversed.

In operation 330, an artificial mark is detected from the ceiling image. To do this, in operation 331, it is determined whether a stored region-of-interest exists. In operation 332, when the region-of-interest does not exist, the region-of-interest is set to an entire region or area of the ceiling image in operation 332, and the artificial mark is detected from the entire region or area of the ceiling image in operation 333. When the region-of-interest does exist, the artificial mark is detected from the stored region-of-interest in operation 333.

In operation 340, a position and an orientation of the mobile robot are estimated according to a result of the artificial mark detection in operation 340. To do this, in operation 341, it is determined whether the artificial mark has been detected. When the artificial mark has not been detected as a determination result in operation 341, the position and the orientation of the mobile robot are calculated using information provided from an encoder sensor in operation 342. When the artificial mark has been detected as a determination result in operation 341, the position and orientation of the mobile robot are calculated using the artificial mark in operation 343. A method of calculating the position and orientation of the mobile robot using the artificial mark will now be described with reference to FIGS. 11A and 11B.

Figure 11A:
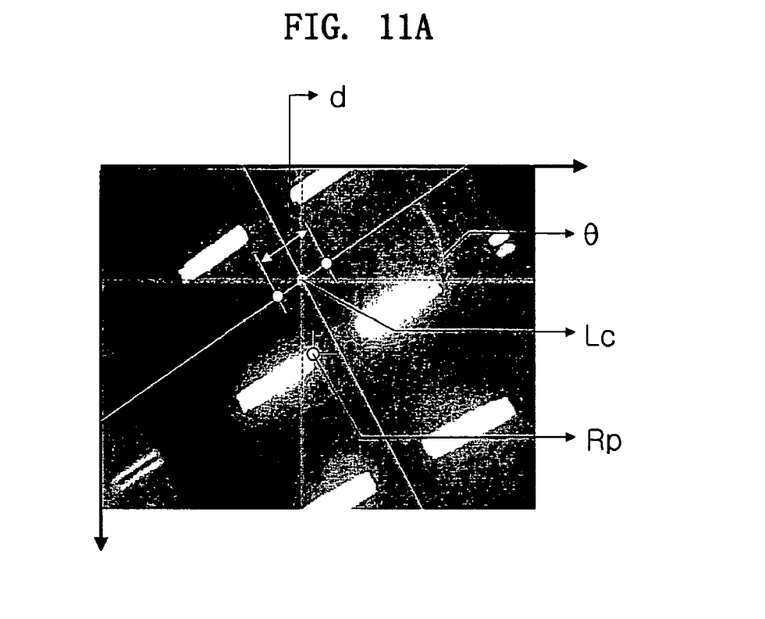
FIGS. 11A and 11B illustrate a method of calculating a position of a mobile robot from a position of a detected artificial mark, according to an embodiment of the invention.

Referring to FIG. 11A, d indicates a distance between the first mark 110 and the second mark 120, θ indicates an angle between a line obtained by expanding a center Lc of the artificial mark 100 toward the x-axis and a line connecting the first mark 110 and the second mark 120, that is, a slope angle of the artificial mark 100 against the x-axis, and Rp indicates a current position of the mobile robot.

Figure 11B:
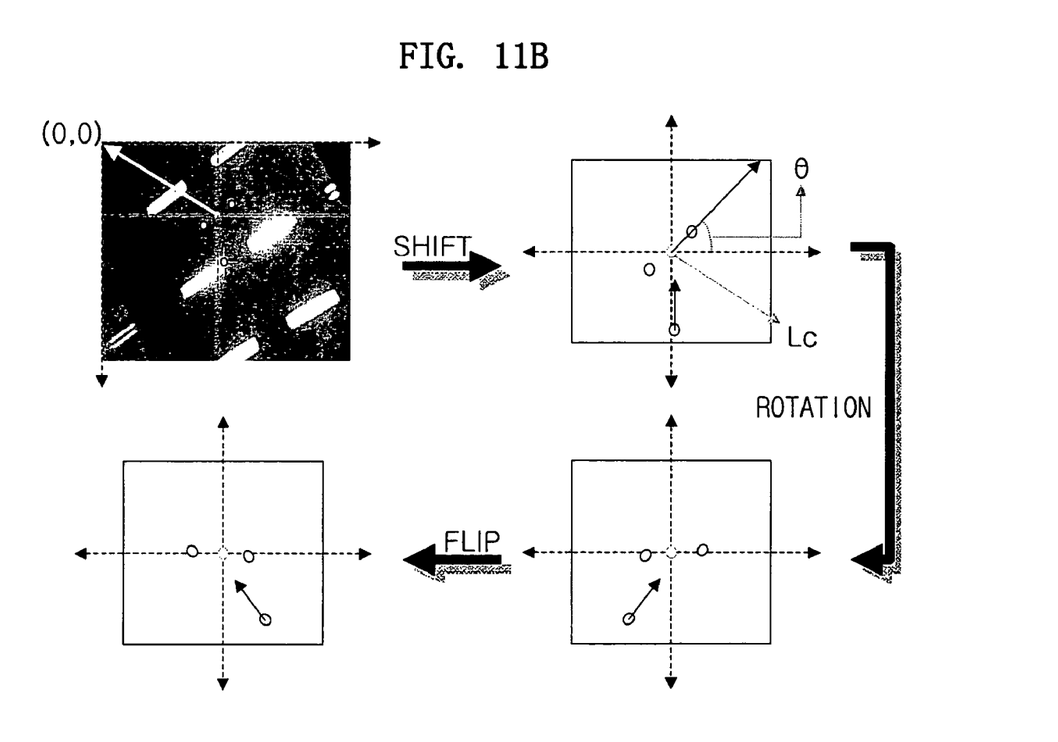

A position and an orientation of the mobile robot can be estimated by performing shift, rotation, and flip processes with respect to the position of the artificial mark 100. Accordingly, the current position of the mobile robot in FIG. 11B is given by Equation 1.

$$\begin{bmatrix} x' \\ y' \\ 1 \end{bmatrix} = H_{scale} H_{flip} H_{rotation} H_{shift} \begin{bmatrix} x \\ y \\ 1 \end{bmatrix} \quad \text{[Equation 1]}$$

Here, $$\begin{bmatrix} x' \\ y' \\ 1 \end{bmatrix}$$

indicates a world coordinate point, and $$\begin{bmatrix} x \\ y \\ 1 \end{bmatrix}$$

indicates a coordinate point of the mobile robot in a camera image.

The conversion functions $H_{shift}$, $H_{rotation}$, $H_{flip}$, and $H_{scale}$ of Equation 1 can be represented as shown in Equation 2.

$$H_{shift} = \begin{bmatrix} 1 & 0 & t_x \\ 0 & 1 & t_y \\ 0 & 0 & 1 \end{bmatrix}$$ [Equation 2]

$$H_{rotation} = \begin{bmatrix} \cos\theta & -\sin\theta & 0 \\ \sin\theta & \cos\theta & 0 \\ 0 & 0 & 1 \end{bmatrix}$$

$$H_{flip} = \begin{bmatrix} -1 & 0 & 0 \\ 0 & 1 & 0 \\ 0 & 0 & 1 \end{bmatrix}$$

$$H_{scale} = \begin{bmatrix} s & 0 & 0 \\ 0 & s & 0 \\ 0 & 0 & 1 \end{bmatrix}$$

Here, $(t_x, t_y)$ indicates a coordinate point of the center Lc of the artificial mark 100, θ indicates a slope angle of the artificial mark 100, and s indicates a value obtained by dividing an actual physical distance of the artificial mark 100 by an image distance of the artificial mark 100.

Traveling of the mobile robot is controlled by using the calculated position and orientation of the mobile robot in operation 344.

Figure 4:
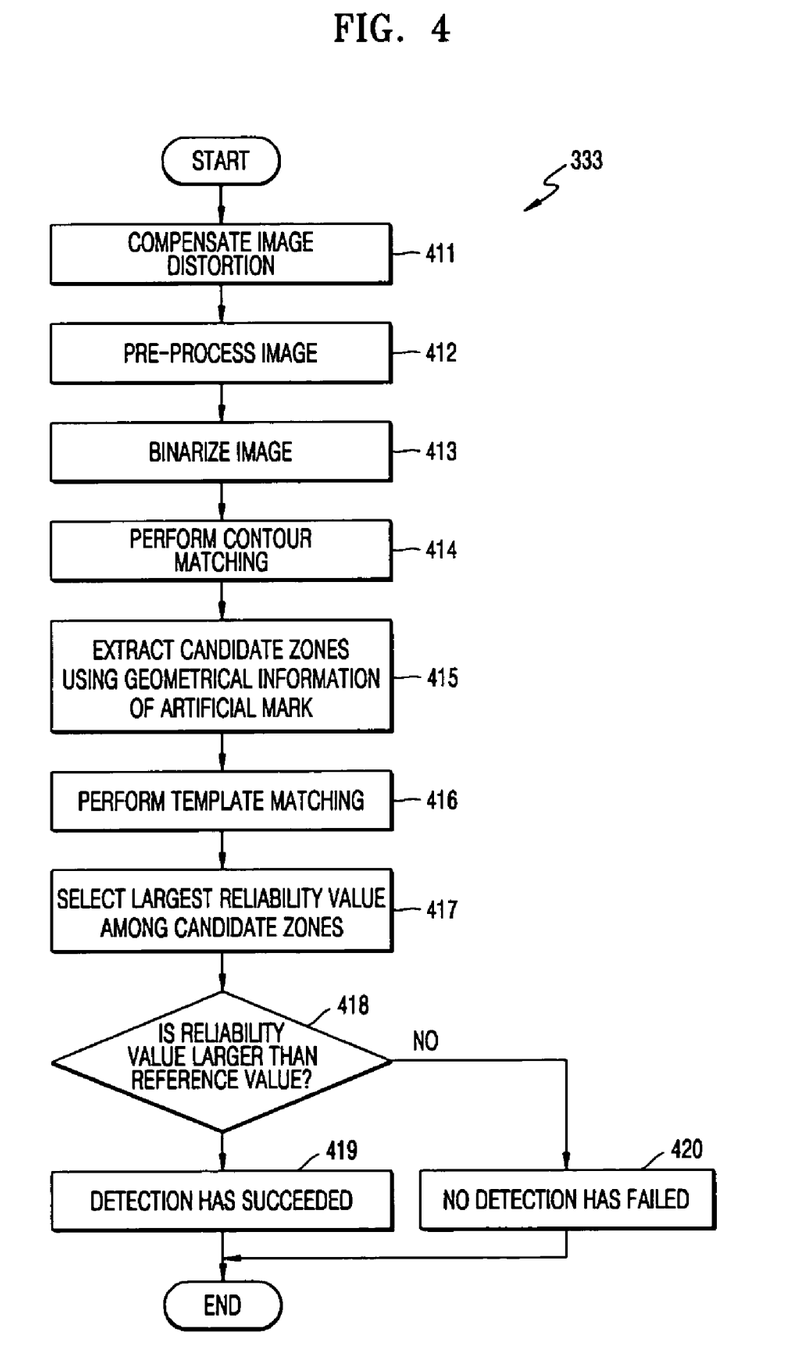
FIG. 4 is a flowchart illustrating the detection mark in Region-of-Interest operation of FIG. 3.

FIG. 4 is a flowchart illustrating operation 333 of FIG. 3. Referring to FIG. 4, a distortion compensation processing procedure, as described using FIGS. 7A and 7B, 8A through 8C and 9A through 9C, is performed with respect to the obtained ceiling image in operation 411. A pre-processing procedure, as described in FIG. 10, is performed with respect to the distortion-compensation-processed ceiling image in operation 412.

In operation 413, an intensity value of each pixel of the pre-processed ceiling image is compared to a predetermined reference value, and binarization is performed by applying "1" to a value of the pixel when the intensity value is greater than the predetermined reference value and applying "0" to the value of the pixel when the intensity value is not greater than the predetermined reference value. Contour matching is performed with respect to the binarized ceiling image in operation 414. A contour matching method of detecting a contour of a region separated by an artificial mark and comparing the contour to a contour of a stored artificial mark is described in "Visual Pattern Recognition by Moment Invariants" (M. Hu. IRE Transactions on Information Theory, 8:2, pp.179-187, 1962).

Candidate regions are extracted from the ceiling image using geometrical information of the artificial mark 100 in operation 415. Reliability values of the candidate regions are calculated by performing template matching with respect to the candidate regions in operation 416. A template matching method using normalized correlations is described in "Digital Image Processing" (Rafael C. Gonzalez, Richard E. Woods, pp. 583-586,1992). A reliability value (γ(s, t)) calculated by the template matching can be represented as shown in Equation 3.

$$\gamma(s,t) = \frac{\sum_x \sum_y [f(x,y) - \overline{f}(x,y)][w(x-s, y-t) - \overline{w}]}{\left\{ \sum_x \sum_y [f(x,y) - \overline{f}(x,y)]^2 \sum_x \sum_y [w(x-s, y-t) - \overline{w}]^2 \right\}}$$ [Equation 3]

Here, f indicates an input candidate region, $\overline{f}$ indicates an average value of pixels included in the candidate region f(x, y) in a region matched to a current position of the artificial mark 100, w indicates an image of the artificial mark 100, i.e., a template image, and $\overline{w}$ indicates an average value of pixels included in the image w(x, y) of the artificial mark 100.

The largest reliability value among the reliability values of the candidate regions calculated as a template matching result is selected in operation 417. The selected reliability value is compared to a predetermined reference value in operation 418. As a comparison result, when the selected reliability value is greater than the reference value, it is determined that detection of the artificial mark 100 succeeds in operation 419, and when the selected reliability value is not greater than the reference value, it is determined that detection of the artificial mark 100 fails in operation 420.

Figure 5:
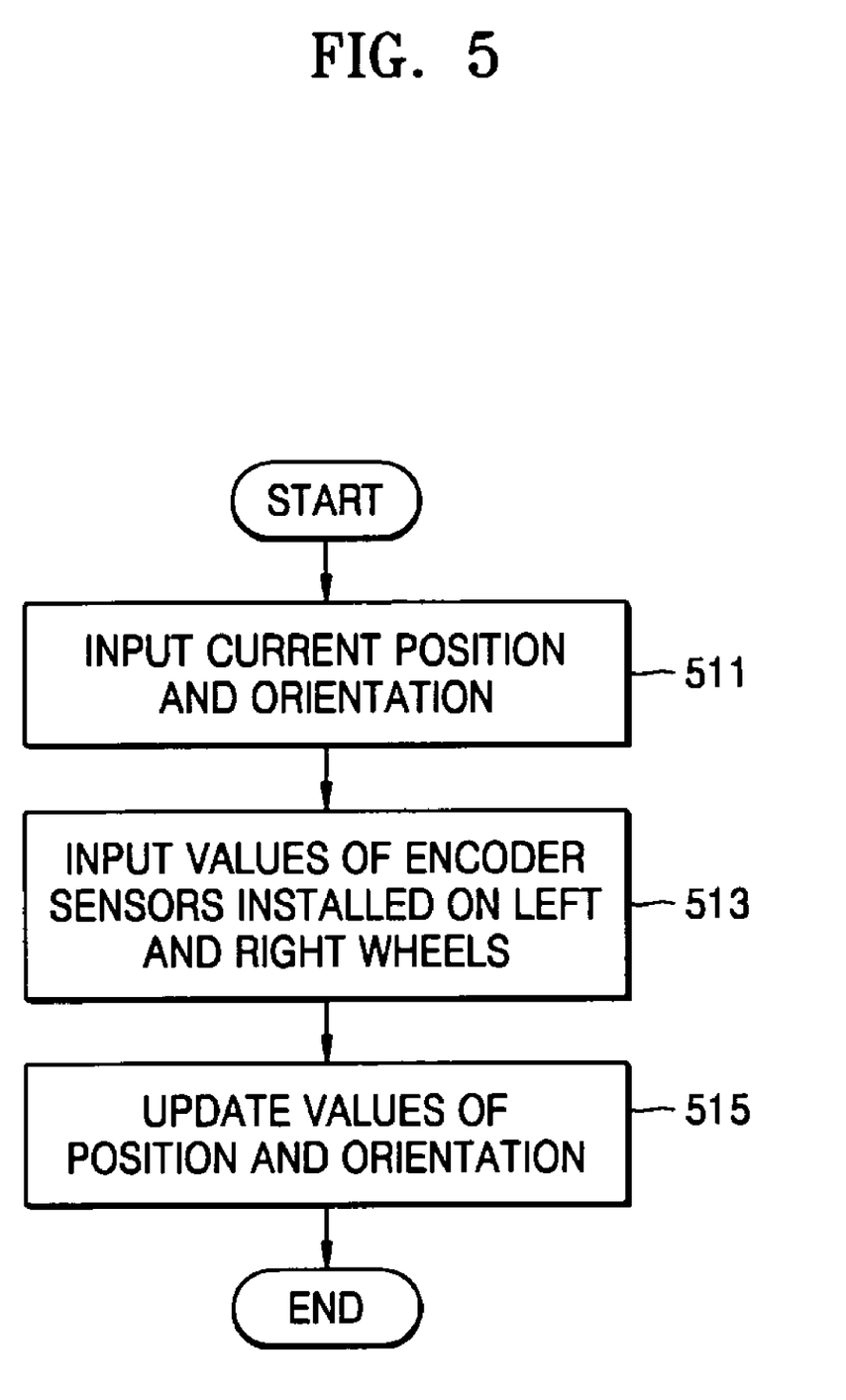
FIG. 5 is a flowchart illustrating the calculate position and orientation of mobile robot using encoder information; operation of FIG. 3.

FIG. 5 is a flowchart illustrating operation 342 of FIG. 3. Referring to FIG. 5, a current position (x, y) and orientation θ of the mobile robot is an input in operation 511. The numbers of pulses ($N_L$, $N_R$) output from encoder sensors (not shown) attached to left and right wheels of the mobile robot are inputs in operation 513. As previously discussed, the locations of the encoder sensors are not limited to the left and right wheels of the mobile robot.

A next position and a next orientation of the mobile robot is obtained using the input current position (x, y) and orientation θ of the mobile robot and the numbers of pulses ($N_L$, $N_R$) output from the encoder sensors in operation 515. To do this, a constant value $c_m$ for converting the number of encoder pulses to a distance actually moved by the wheels is calculated as shown in Equation 4.

$$c_m = \pi D_n/nC_e$$ [Equation 4]

Here, $D_n$ indicates a diameter of the wheel, $C_e$ indicates a resolution of the encoder, i.e., the number of encoder pulses per 1 revolution, and n indicates a gear ratio between a motor to which the encoder is installed and the wheel.

A traveling distance $\Delta U_{L/R,i}$ of each of left and right wheels actually moved is calculated by the number of encoder pulses, as shown in Equation 5.

$$\Delta U_{L/R,i} = c_m N_{L/R,i}$$ [Equation 5]

Here, $N_{L/R,i}$ indicates the number of pulses of encoder sensors attached to the left and right wheels of the mobile robot at a time i.

An average movement distance displacement $\Delta U_i$ of the wheel center and a converted azimuth displacement $\Delta\theta_i$ can be represented as shown in Equation 6 and Equation 7.

$$\Delta U_i = (\Delta U_R + \Delta U_L)/2.$$ [Equation 6]

$$\Delta\theta_i = (\Delta U_R - \Delta U_L)/b$$ [Equation 7]

Here, b indicates a distance between the left wheel and the right wheel.

Updating of the position and the orientation of the mobile robot at a time i can be performed using Equation 8.

$$x_i = x_{i-1} + \Delta U_i \cos \theta_i$$

$$y_i = y_{i-1} + \Delta U_i \sin \theta_i$$

$$\theta_i = \theta_{i-1} + \Delta \theta_i \qquad \text{[Equation 8]}$$

The invention can also be embodied as computer readable codes on a computer readable recording medium to be read by at least one computer. The computer readable recording medium is any data storage device that can store data, which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the invention can be easily construed by programmers skilled in the art to which the invention pertains.

As described above, the position and orientation of a mobile robot can be estimated in a real time using an image processing procedure that makes less noise in an environment having a dark light or a severe light change. Also, the image processing procedure for mark detection can be simplified by installing a few number of artificial marks on a ceiling of a place in which the mobile robot travels and detecting the artificial marks using a pattern recognition method.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for estimating a position and an orientation of a mobile device, the apparatus comprising:
    an image grabber obtaining an image of an area where the mobile device travels;
    an image processor processing the obtained image;
    a mark detector detecting a position of an artificial mark from the obtained and processed image, the artificial mark including a first mark and a second mark; and
    a position & orientation estimator estimating a position and an orientation of the mobile device using the detected position of the artificial mark,
    wherein the first and second marks are positioned apart from each other at a predetermined distance, an outer portion of the first mark and an inner portion of the second mark being non-reflective portions, and an inner portion of the first mark and an outer portion of the second mark being infrared reflective portions.

2. The apparatus of claim 1, wherein the image processor determines an environment from the obtained image and performs a predetermined image processing procedure according to the determined environment.

3. The apparatus of claim 2, wherein the image processor compares an average intensity of the obtained image to a reference value, and when the light of the current environment is in a dark state according to the comparison result, the image processor reverses light and dark portions of the obtained image to dark and light portions, respectively, to obtain a reversed image, and performs the predetermined image processing procedure with respect to the reversed image, the reversing of the light and dark portions to dark and light portions is providing a negative of the obtained image.

4. The apparatus of claim 1, wherein the mark detector detects at least one candidate region with respect to the obtained image, selects a largest reliability value as a template matching result with respect to the detected at least one candidate region, compares the selected reliability value to a predetermined reference value, and determines whether detection of the artificial mark is successful according to a comparison result.

5. A mobile robot comprising:
    an image grabber obtaining an image of an area in which the mobile robot travels;
    an image intensity comparator determining whether a light of a current environment is dark or bright by calculating an average intensity of the obtained image and comparing the calculated average intensity to a predetermined reference value;
    an image processor selectively reversing the obtained image and not reversing the obtained image according to a determination result of the image intensity comparator;
    a light controller controlling a light device attached to the mobile robot according to the determination result of the image intensity comparator;
    a mark detector detecting a position of an artificial mark including a first mark and a second mark from the obtained image;
    a position & orientation estimator estimating a position and an orientation of the robot using the detected position of the artificial mark; and
    a motion controller controlling traveling of the mobile robot according to the position and the orientation estimated by the position & orientation estimator,
    wherein the first and second marks are positioned apart from each other at a predetermined distance, an outer portion of the first mark and an inner portion of the second mark being non-reflective portions, and an inner portion of the first mark and an outer portion of the second mark being infrared reflective portions.

6. The mobile robot of claim 5, wherein the image processor determines a current environment from the obtained image and performs a predetermined image processing procedure according to the determined environment.

7. The mobile robot of claim 6, wherein the image processor compares an average intensity of the obtained image to a reference value, and when the light of the current environment is in a dark state according to the comparison result, the image processor reverses light and dark portions of the obtained image to dark and light portions, respectively, to obtain a reversed image, and performs distortion compensation processing and pre-processing with respect to the reversed image, the reversing of the light and dark portions to dark and light portions is providing a negative of the obtained image.

8. The mobile robot of claim 5, wherein the mark detector detects at least one candidate region, selects a largest reliability value as a template matching result with respect to the detected at least one candidate region, compares the selected reliability value to a predetermined reference value, determines whether detection of the artificial mark is successful according to a comparison result.

9. An apparatus for estimating a position and an orientation of a mobile device, the apparatus comprising:

an image grabber to obtain an image of an area where the mobile device operates;

an image intensity comparator to calculate an average intensity of the image and determine whether an illumination level in the area is dark according to a predetermined illumination level;

an image processor to reverse light and dark portions of the image to dark and light portions, respectively, to obtain a reversed image, when the light in the area is determined to be dark, and perform at least one of distortion compensation processing and pre-processing procedures on a non-dark image or the reversed image, the reversing of the light and dark portions to dark and light portions is providing a negative of the obtained image;

a mark detector to detect an artificial mark from the image, the artificial mark includes a first mark and a second mark;

an encoder information capturer to obtain position information and orientation information of the mobile device from at least one encoder sensor attached to the mobile device;

a position and orientation estimator to selectively estimate the position and the orientation of the mobile device using the position of the artificial mark that is detected by the mark detector when the mark detector is able to positionally detect the artificial mark or selectively estimate the position and the orientation of the mobile device using the information provided by the encoder information capturer when the mark detector is unable to positionally detect the artificial mark; and a travel controller to control the mobile device to travel along a path using the position and orientation information obtained by the position and orientation estimator, wherein the first and second marks are positioned apart from each other at a predetermined distance, an outer portion of the first mark and an inner portion of the second mark being non-reflective portions, and an inner portion of the first mark and an outer portion of the second mark being infrared reflective portions.

10. The apparatus for estimating the position and the orientation of the mobile device as claimed in claim 9, wherein the image processing device alters a lightness or darkness of the artificial mark so that it is different from an area surrounding the artificial mark, thereby enabling the mark detector to more easily detect the artificial mark from the image.

11. The apparatus for estimating the position and the orientation of the mobile device as claimed in claim 9, wherein the image processor performs the pre-processing procedure of the image for which the distortion compensation processing procedure is performed in order to adjust a contrast and/or an exposure of the image such that a resolution of a specific region of the image is increased.

12. The apparatus for estimating the position and the orientation of the mobile device as claimed in claim 11, wherein the image processing device adjusts the contrast and/or the exposure of the image by adjusting the contrast so that a dark portion of the image is darkened and a bright portion of the image is brightened, and adjusting the exposure by multiplying each pixel of the image by a constant, thereby increasing the resolution of a specific region of the image.

13. The apparatus for estimating the position and the orientation of the mobile device as claimed in claim 9, further comprising:

a light controller to control the light in the area such that when the image intensity comparator determines that the area is in a dark state according to a predetermined lightness value, the light controller increases the amount of light in the area, and when the image intensity comparator determines that the area is in a bright state according to the predetermined lightness value, the light controller decreases the amount of light in the area.

14. The apparatus for estimating the position and the orientation of the mobile device as claimed in claim 13, wherein the light controller is attached to the mobile device.

15. The apparatus for estimating the position and the orientation of the mobile device as claimed in claim 9, wherein the image intensity comparator calculates the average intensity of the image by dividing a value of summing intensity of all pixels of the image by the number of all pixels, and compares the calculated average intensity to a predetermined reference value.

16. An apparatus for estimating a location of a mobile device in an environment having changes in illumination, the apparatus comprising:

a device to obtain an image of the area where the mobile device is operating;

an image processor to determine a level of illumination according to an amount of light measured in the environment and to reverse the image when the amount of light is not greater than a predetermined level;

a detector to detect an artificial mark from the image obtained by the image processor; and a location determination device to selectively estimate the location of the mobile device according to the detected artificial mark or information from at least one encoder sensor provided on the mobile device, wherein the location of the mobile device is calculated using information provided from the at least one encoder sensor when the artificial mark is not detected by the detector, and the location of the mobile device is calculated using the artificial mark when the artificial mark is detected by the detector, and wherein the artificial mark includes a first mark having a non-reflective portion and an infrared reflective portion, and a second mark having a non-reflective portion and an infrared reflective portion and located a predetermined distance apart from the first mark.

17. The apparatus for estimating the location of the mobile as claimed in claim 16, wherein the location of the mobile device includes a position and an orientation of the mobile device.

18. The apparatus for estimating the location of the mobile as claimed in claim 16, wherein the image processor performs at least one of distortion compensation processing and pre-processing procedures on a non-processed or reversed image.

19. The apparatus for estimating the location of the mobile as claimed in claim 16, wherein the device to obtain the image includes a wide-angle lens and obtains the image of the area where the mobile device operates.

20. The apparatus for estimating the location of the mobile as claimed in claim 16, wherein the location determination device estimates the location of the mobile device with respect to a location of the artificial mark according to a calculated distance between the first mark and the second mark and a calculated angle between a line obtained by expanding a center of the artificial mark toward the x-axis and a line connecting the first mark and the second mark.

21. The apparatus for estimating the location of the mobile as claimed in claim 16, wherein the location determination device estimates the location of the mobile device by performing a shift process, a rotation process, and a flip process with respect to a location of the artificial mark.

22. The apparatus for estimating the location of the mobile as claimed in claim 16, wherein the image processor compares an average intensity of the image to a reference level, and reverses light and dark portions of the ceiling image to dark and light portions, respectively, to obtain a reversed image, and performs distortion compensation processing and pre-processing with respect to the reversed image when the light of the current environment is not greater than the reference level according to the comparison result, the reversing of the light and dark portions to dark and light portions is providing a negative of the obtained image.

23. The apparatus for estimating the location of the mobile as claimed in claim 16, wherein the at least one encoder sensor is attached to a wheel of the mobile device and detects the location of the mobile device when the artificial mark on the image is not detected by the detector.

24. The apparatus for estimating the location of the mobile as claimed in claim 16, wherein the at least one encoder sensor comprises:
- a first encoder sensor attached to a first wheel located on a first side of the mobile device;
- a second encoder sensor attached to a second wheel located on a second side of the mobile device that is parallel with the first side; and
- wherein a number of encoder pulses output from the first encoder sensor and the second encoder sensor is used to calculate the location of the mobile device according to a distance moved by the wheels of the mobile device.

\* \* \* \* \*